United States Patent
Deville et al.

(10) Patent No.: US 12,274,956 B2
(45) Date of Patent: Apr. 15, 2025

(54) SUPRAMOLECULAR HOST GUEST PRODUCT CONCENTRATORS FOR PRODUCTION FLUIDS

(71) Applicant: Halliburton Energy Services, Inc., Houston, TX (US)

(72) Inventors: Jay Deville, Houston, TX (US); Enrique Antonio Reyes, Houston, TX (US); Antonio Recio, Houston, TX (US); William W. Shumway, Houston, TX (US); Ronald Bosch, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/313,999

(22) Filed: May 8, 2023

(65) Prior Publication Data

US 2023/0271111 A1    Aug. 31, 2023

Related U.S. Application Data

(63) Continuation-in-part of application No. 17/876,432, filed on Jul. 28, 2022, now abandoned.
(Continued)

(51) Int. Cl.
*E21B 43/16* (2006.01)
*B01D 17/04* (2006.01)
(Continued)

(52) U.S. Cl.
CPC .......... *B01D 17/047* (2013.01); *C09K 8/5086* (2013.01); *C10G 33/00* (2013.01); *E21B 43/16* (2013.01); *E21B 43/34* (2013.01)

(58) Field of Classification Search
CPC .... B01D 17/047; C09K 8/5086; C10G 33/00; E21B 43/16; E21B 43/34
See application file for complete search history.

(56) References Cited

U.S. PATENT DOCUMENTS

| | | | |
|---|---|---|---|
| 9,656,889 B2 | 5/2017 | Lucente-Schultz et al. | |
| 9,670,399 B2 | 6/2017 | Reyes et al. | |

(Continued)

FOREIGN PATENT DOCUMENTS

| | | |
|---|---|---|
| CN | 109970146 A | 7/2019 |
| WO | 2014-116335 | 7/2014 |

(Continued)

OTHER PUBLICATIONS

International Search Report and Written Opinion for International Patent Application No. PCT/US2023/076722 dated Feb. 2, 2024. PDF file. 9 pages.
(Continued)

*Primary Examiner* — Silvana C Runyan
(74) *Attorney, Agent, or Firm* — Thomas Rooney; C. Tumey Law Group PLLC

(57) ABSTRACT

A method may include: introducing a treatment fluid into a production fluid disposed in a surface well system, the treatment fluid comprising: a base fluid; and a supramolecular host guest product comprising: a treatment fluid additive comprising a surfactant; and a supramolecular host molecule, wherein the supramolecular host molecule is not covalently bonded to the treatment fluid additive; introducing the production fluid containing the treatment fluid into a production facility separator; and separating, in the production facility separator, at least a portion of the production fluid to form a water stream.

8 Claims, 3 Drawing Sheets

Related U.S. Application Data

(60) Provisional application No. 63/276,941, filed on Nov. 8, 2021.

(51) Int. Cl.
    *C09K 8/508*     (2006.01)
    *C10G 33/00*     (2006.01)
    *E21B 43/34*     (2006.01)

(56) References Cited

U.S. PATENT DOCUMENTS

| | | | |
|---|---|---|---|
| 10,087,310 B2 * | 10/2018 | Kornfield | C08G 83/008 |
| 11,447,686 B2 | 9/2022 | Johnson et al. | |
| 11,603,491 B2 | 3/2023 | Weider et al. | |
| 11,655,168 B2 * | 5/2023 | Hurd | C09K 8/524 |
| | | | 210/698 |
| 2011/0108271 A1 * | 5/2011 | Hinkel | C09K 8/584 |
| | | | 166/270.1 |
| 2013/0130950 A1 | 5/2013 | Chen et al. | |
| 2013/0269944 A1 | 10/2013 | Reyes et al. | |
| 2014/0217033 A1 * | 8/2014 | Lucente-Schultz | B01D 17/04 |
| | | | 210/698 |
| 2015/0218432 A1 | 8/2015 | Quintero et al. | |
| 2020/0325070 A1 * | 10/2020 | Patel | C04B 24/405 |
| 2021/0079284 A1 * | 3/2021 | Deville | C09K 8/34 |

FOREIGN PATENT DOCUMENTS

| | | |
|---|---|---|
| WO | 2021-007441 | 1/2021 |
| WO | 2021162757 | 8/2021 |
| WO | 2021168016 | 8/2021 |
| WO | 2021168252 | 8/2021 |
| WO | 2022251449 | 12/2022 |

OTHER PUBLICATIONS

International Search Report and Written Opinion for PCT/US2022/039919 dated Nov. 24, 2022.

Office Action Summary for U.S. Appl. No. 17/876,432 dated Apr. 17, 2023.

* cited by examiner

SUPRAMOLECULAR HOST GUEST PRODUCT CONCENTRATORS FOR PRODUCTION FLUIDS

CROSS-REFERENCE TO RELATED APPLICATION

The present application is a Continuation-in-Part of U.S. Patent Application Publication No. 2023/0148311 A1 filed Jul. 28, 2022, which is a non-provisional application of provisional patent application No. 63/276,941 filed on Nov. 8, 2021, which are incorporated herein by reference in their entirety for all purposes.

BACKGROUND

In oil field and refinery operations, treatment fluids may be used for a variety of applications related to the treatment of crude oil in a surface environment. For example, treatment fluids may be used for objectives such as emulsion breaking, corrosion inhibition, scale inhibition or control, hydrate inhibition or control, organic or inorganic solids control, water clarification or reverse emulsion breaking, desalting, gas scavenging, and other chemical treatments that may aid in production and refining operations. In some examples, additives contained in the treatment fluid may impart specific desired and/or beneficial properties to the treatment fluid which may increase the efficiency and/or efficacy of the operations which occur in production and refinery systems. In other examples, additives contained in the treatment fluids may at least partially protect the production and refinery systems from damage. For example, among other benefits, additives contained in treatment fluids may provide beneficial properties for emulsion breaking, desalting, corrosion inhibition, asphaltene and paraffin prevention or remediation, H2S prevention, lubrication, and flocculation prevention. In some examples, treatment fluids may be formulated with excess additives to ensure that an adequate concentration of the additive at an interface of interest is maintained.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
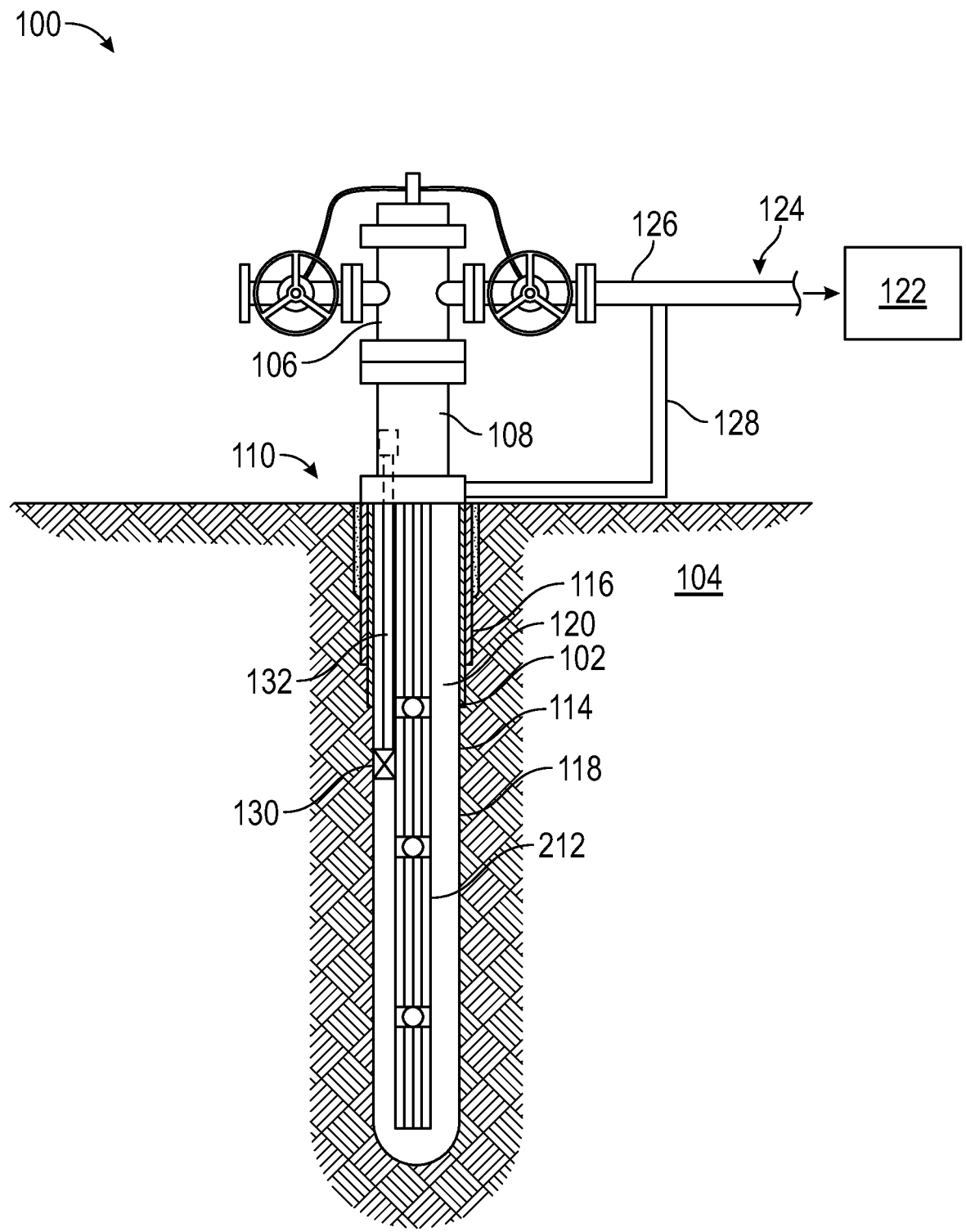
FIG. 1 is a schematic illustration of a producing well in accordance with some embodiments of the present disclosure.

Disclosed herein are methods, compositions, and systems for the treatment of fluids extracted from subterranean formations (e.g., production fluids) using treatment fluids comprising a supramolecular host guest product. The pore space in a subterranean formation may contain multiple liquid and gas components including but not limited to formation water, liquid hydrocarbons, gaseous hydrocarbons, carbon dioxide, hydrogen sulfide, and other liquids and gasses. In some examples, when production fluids are being relayed from a subterranean formation (e.g., a reservoir containing hydrocarbons) to a surface location (e.g., the wellhead or production tree), emulsions (e.g., oil-in-water, water-in-oil, or water-in-oil-in-water), including Pickering emulsions, may form between the various components of the production fluid (e.g., oil, water, gas, etc.). When production fluids are further relayed from the surface location (e.g., a wellhead or production tree) to a surface facility (e.g., separation facility, metering facility, production facility, storage facility), the production fluids may again be commingled within a single conduit, providing for an additional opportunity for emulsions to form.

In some examples, the production facility equipment may include separation equipment which may, at least partially, separate various components of the production fluids into production streams (e.g., an oil stream, a water stream, and/or a gas stream). The production streams may be single component or phase streams or multi-component streams. In further examples, the separation equipment of the production facility may aid in breaking emulsions formed between the various components of the production fluids. Separation equipment typically uses gravity, enhanced gravity, electrocoalescence, flotation, heat-accelerated coalescence, and flocculation for breaking emulsions. In embodiments, the separation equipment may include equipment including, without limitation, as separators, skimmers, free water knock-outs, electrostatic coalescers, heater treaters, desalters, flotation units, corrugate plate interceptors, hydrocyclones, and centrifuges.

In embodiments, the separation equipment of the production facility may not be fully effective at breaking the emulsions formed between the various components of the production fluids. As such, in some examples, surfactants may be added to the well system (e.g., wellbore, wellhead, flow lines, production facilities, etc.) to inhibit the formation of emulsions. As used herein, the term "inhibit," and its derivatives refers to a reduction in the tendency of a phenomenon occurring and/or a reduction in the degree to which the phenomenon occurs. The term "inhibit," does not imply any particular degree or amount of inhibition. In further examples, in the event that an emulsion is formed, the surfactants may reduce the stability of the emulsion, thereby allowing it to break in a shorter amount of time, or with less required energy. Surfactants may be added to the well system, flow lines, or production facility at any location including but not limited to in the wellbore, in the wellhead, in the flow lines extending from the wellhead to the production facility, in any flow lines which connect one piece of equipment to another piece of equipment, and/or within any piece of equipment located within the production facility. The surfactants may be added to a wellbore, for example, by way of annulus drip, a slip stream, a capillary string, batch treatments, and/or bullheading. The surfactants may be added at any other injection point in the well system, flow lines, or production facility by means including slip streaming, injection, and/or manual addition.

Treatment fluids often utilize an excess of surfactant such that when the treatment fluid is introduced into the well system, flow lines, or production facility it is ensured that an adequate concentration of the surfactant is maintained at an interface of interest. Treatment fluids which are formulated with supramolecular host guest products may facilitate concentration of the treatment fluid additives (e.g., surfactants) at an interface of interest such that treatment fluid is more effective. Treatment fluids may include a base fluid and a supramolecular host guest product containing a treatment fluid additive. In some examples, utilizing supramolecular host guest products may allow for a lower concentration of additives (e.g., surfactants) to be utilized as compared to a treatment fluid which does not contain supramolecular host guest products. As used herein, supramolecular host guest products are molecular complexes that are composed of two or more molecules or ions that are bound by forces other than full covalent bonds. Supramolecular host guest products may include a treatment fluid additive (guest) and a supramolecular host molecule, wherein the host and guest are not covalently bonded, to the treatment fluid additive and facilitates the transport of the treatment fluid additive within the bulk phase of the treatment fluid to an interface.

The supramolecular host guest products may be applicable to demulsification applications. For example, the supramolecular host guest products may increase interfacial activity in desalters, free water knockout equipment, heater treaters, treating tanks, and other processes used for demulsification by promoting greater chemical availability at the interface in a vessel. Such vessels and processes may be used in portions of the production facilities, processing facilities, or refinery facilities. The supramolecular host guest products may also allow for increased efficacy in emulsion breaking operation such as in tank treating processes. Supramolecular host guest products may increase the efficacy of additional refinery applications including corrosion inhibition, decoking operations, and reducing corrosion damage associated with acids service. In offshore applications, the supramolecular host guest products may reduce the amount of acid required to treat and manage the water-soluble organics in the produced fluid stream.

In some examples, the supramolecular host guest products may be applicable to breaking reverse emulsions along with water clarification applications. In further examples the supramolecular host guest products may increase interfacial activity in coalescers, floatation cells, interceptors, filtration systems and clarifiers by promoting greater chemical availability at the interface in a vessel. Such vessels and processes may be used in portions of the production facilities, processing facilities, or refinery facilities. The supramolecular host guest products may also allow for increased efficacy in emulsion breaking operations.

Supramolecular host guest products may comprise a supramolecular host molecule and treatment fluid additive (guest) where the supramolecular host molecule may arrange in a variety of structures with the treatment fluid additive. For example, nanostructures may host alkoxylates which may promote the breaking of an emulsion. Non-limiting examples of these structures may include micelles, liposomes, nanostructures, and nanobubbles. Examples of supramolecular host molecules may include nanostructures, metal organic frameworks, crown ethers, lariat ethers, cavitands, cryptands, rotaxanes, catenanes, or any combination thereof. Cavitands may be cavity containing molecules which are capable of host guest interactions with molecules of a similar size and shape. Examples of cavitands may include cyclodextrins, calixarenes, pillararenes, and curcurbiturils. Calixarenes may be three-dimensional host structures which may trap treatment fluid additives. In some examples calixarenes may deliver treatment fluid additives to an interface where they may be beneficial to an oil field operation. Cryptands may be cation specific molecules with covalently bound tri-valent and multi-valent binding sites which may assembled in a cyclic or polycyclic structure. Examples of cryptands may include polyetheramines and 1,10-diaza-4,7,13,16,21,24-hexaoxabicyclo[8.8.8]hexacosane. Examples of cations for complexation may include ammonium (NH4+), lanthanoids, alkali metals, and alkaline earth metals. Rotaxanes may be a rod-like molecule wherein a portion of the rod is enclosed by a ring-like structure. The ends of the rod-like portion of the molecule may further comprise oversized end-groups which entrap the ring. Catenanes may be structured as two cyclic compounds which may not be covalently bonded, however, covalent bond cleavage is required for disruption of the supramolecular structure. In some examples, crown ethers may selectively host specific ions depending on their size. In further examples, 18 crown 6 may selectively host potassium while 15 crown 5 may host sodium and 12 crown 4 may host lithium. Additional suitable supramolecular host molecules may further comprise modified silica nanoparticles, modified clay nanoparticles, modified graphene nanoparticles, or modified nanocellulose nanoparticles. In some examples, silica-encapsulated molecular organic frameworks may be used as supramolecular host molecules.

In some examples, the supramolecular host molecule may include modified silica-based materials and/or metal oxides. In further examples, modified silica-based materials may include silica nanoarchitectures including fibrous silica, silica nanospheres, hollow silica nanoparticles, silica nanowires, silica nanopillars, silica nanoribbons, silica nanotubes, silica nanobelts, silica nanorods, silica nanocubes, and combinations thereof. In some examples, metal oxides used as supramolecular host molecules, may include copper(II) oxide, nickel(II) oxide, manganese(II) oxide, cobalt(II) oxide, neodymium(III) oxide, iron(II) oxide, tungsten trioxide, molybdenum trioxide, copper(I) oxide, zinc oxide, titanium dioxide, magnesium oxide, and combinations thereof.

Supramolecular host guest products may include a surfactant as a treatment fluid additive (guest). In embodiments, surfactants may include, without limitation, anionic surfactants such as sodium, potassium, and ammonium salts of long chain alkyl sulfonates and alkyl aryl sulfonates (such as sodium dodecylbenzene sulfonate); dialkyl sodium sulfosuccinates (such as sodium dodecylbenzene sulfonate or sodium bis-(2-ethylthioxyl)-sulfosuccinate); alkyl sulfates (such as sodium lauryl sulfate); alkyl sulfonates (such as methyl sulfonate, heptyl sulfonate, decylbenzene sulfonate, dodecylbenzene sulfonate); and alkoxylated sulfates; nonionic surfactants such as ethoxylated alcohols and polyglucosides; cationic surfactants such as alkyl ammonium bromides, and amphoteric or zwitterionic surfactants such as hydroxysultaines (e.g., cocoamidopropyl hydroxysultaine, lauramidopropyl hydroxysultaine, lauryl hydroxysultaine, etc.), and combinations thereof. Additional surfactants may include polymeric alkoxylates of phenolic resins, bis-phenol polymers, imines, alcohols, esters and complex esters thereof, quaternary amines and polymers thereof, low molecular-weight aliphatic moieties, or polar organic functional groups such as amidoamines, amines, amides, glycols, silicates, polymers (e.g.: polyacrylamide, partially hydrolyzed polyacrylamide ("PHPA"), polyvinylpyrrolidone ("PVP")), esters, ethers, quaternized alkyl or aryl molecules, conjugates or derivatized macromolecules, oxidizer or oxidizing agents, reducer or reducing agents, metal (oxy)anion salts where the metal is a multivalent (n) cation (n=+2, +3, +4, +5, +6, +7) and the anion is a halide, sulfur or selenium, nitrogen or phosphorous, and combinations thereof.

Treatment fluids, including but not limited to surfactants used in fluid separation operations, which may include a treatment fluid additive (guest) such as small charged species, low molecular-weight aliphatic moieties, and polar organic functional groups (ie, amidoamines, amines, amides, esters, ethers, etc.). The treatment fluids may include combinations of supramolecular host guest products which may be present in any suitable amount. For example, the supramolecular host guest products which includes a treatment fluid additive may be present in the treatment fluid in an amount ranging from about 0.01 wt. % to about 99.99 wt. %. The treatment fluid additive may also be present in the supramolecular host guest product in an amount ranging from about 0.01 wt. % to about 99.99 wt. %. Alternatively in some applications, the treatment fluid additive may be present in the treatment fluid in an amount ranging from about 5 wt. % to about 95 wt. %. In some examples, the treatment fluid additive may be present in the treatment fluid in an amount ranging from about 5 wt. % to about 15 wt. %, about 15 wt. % to about 25 wt. %, about 25 wt. % to about 35 wt. %, about 35 wt. % to about 45 wt. %, about 45 wt. % to about 55 wt. %, about 55 wt. % to about 65 wt. %, about 65 wt. % to about 75 wt. %, about 75 wt. % to about 85 wt. %, about 85 wt. % to about 95 wt. %, or any ranges in between. The treatment fluid additive may also be present in the supramolecular host guest product in an amount ranging from about 5 wt. % to about 95 wt. %. In some examples, the treatment fluid additive may be present in the supramolecular host guest product in an amount ranging from about 5 wt. % to about 15 wt. %, about 15 wt. % to about 25 wt. %, about 25 wt. % to about 35 wt. %, about 35 wt. % to about 45 wt. %, about 45 wt. % to about 55 wt. %, about 55 wt. % to about 65 wt. %, about 65 wt. % to about 75 wt. %, about 75 wt. % to about 85 wt. %, about 85 wt. % to about 95 wt. %, or any ranges in between. In other examples, the treatment fluid additive may be present in the treatment fluid in an amount ranging from about 15 wt. % to about 75 wt. %. The treatment fluid additive may also be present in the supramolecular host guest product in an amount ranging from about 15 wt. % to about 75 wt. %.

The supramolecular host molecule may be present in the treatment fluid in any suitable amount. For example, the supramolecular host molecule may be present in the treatment fluid in an amount ranging from about 0.01 wt. % to about 99.99 wt. %. The supramolecular host molecule may also be present in the supramolecular host guest product in an amount ranging from about 0.01 wt. % to about 99.99 wt. %. Alternatively in some applications, the supramolecular host molecule may be present in the treatment fluid in an amount ranging from about 5 wt. % to about 95 wt. %. In some examples, the supramolecular host molecule may be present in the treatment fluid in an amount ranging from about 5 wt. % to about 15 wt. %, about 15 wt. % to about 25 wt. %, about 25 wt. % to about 35 wt. %, about 35 wt. % to about 45 wt. %, about 45 wt. % to about 55 wt. %, about 55 wt. % to about 65 wt. %, about 65 wt. % to about 75 wt. %, about 75 wt. % to about 85 wt. %, about 85 wt. % to about 95 wt. %, or any ranges in between. The supramolecular host molecule may also be present in the supramolecular host guest product in an amount ranging from about 5 wt. % to about 95 wt. %. In some examples, the supramolecular host molecule may be present in the supramolecular host guest product in an amount ranging from about 5 wt. % to about 15 wt. %, about 15 wt. % to about 25 wt. %, about 25 wt. % to about 35 wt. %, about 35 wt. % to about 45 wt. %, about 45 wt. % to about 55 wt. %, about 55 wt. % to about 65 wt. %, about 65 wt. % to about 75 wt. %, about 75 wt. % to about 85 wt. %, about 85 wt. % to about 95 wt. %, or any ranges in between. In other examples, the supramolecular host molecule may be present in the treatment fluid in an amount ranging from about 15 wt. % to about 75 wt. %. The supramolecular host molecule may also be present in the supramolecular host guest product in an amount ranging from about 15 wt. % to about 75 wt. %.

In some examples, in addition to a surfactant, one or more other treatment fluid additives may be included. For example, the one or more additional treatment fluid additives may include corrosion inhibitor, scale inhibitor, salt inhibitor, paraffin inhibitor, water clarifier, emulsion breakers, hydrate inhibitors, scavengers, antiscalants, dispersants, wetting agents, amine control chemicals, calcium control chemicals, asphaltene control chemicals, settling aids, and any combination thereof.

Treatment fluids may include a base fluid and a supramolecular host guest product comprising a treatment fluid additive. In some examples the supramolecular host guest products may be synthesized in polar and/or non-polar solvents. In further examples, a polar solvent may include water, and a non-polar solvent may include oil, mineral oil, or other non-water-miscible mediums. The treatment fluid may be prepared using any suitable method. For example, a base fluid and a supramolecular host guest product may be mixed to form the treatment fluid which may then be introduced into a wellbore, production system, or refinery process stream. The mixing process may be achieved by any suitable method and/or equipment. In some examples, blenders, mixers, stirrers, and the like, may be utilized to form the treatment fluid. Additional methods of mixing may include sequentially adding components while performing batch mixing or continuous ("on-the-fly") blending operations, utilizing liquid additive pumps ("LA pump") to meter out specific volumes of given components, and/or slip-streaming either of the additives and/or the supramolecular host guest product into the base fluid. In some examples the process of preparing the treatment fluid may take place at the well site location, production storage location, or a refinery location while in other examples the treatment fluid may be prepared, either in whole or in part, at an offsite location and then transported to location to be used.

Base fluids may include, without limitation, oleaginous fluids, synthetic fluids, aqueous fluids, and combinations thereof. In some examples, the treatment fluids may be in the form of an emulsion. An example of a suitable emulsion may be in the form of an invert emulsion that comprises an oleaginous continuous phase and a non-oleaginous discontinuous phase. Another example of a suitable oilfield emulsion may be in the form of a direct emulsion that comprises a non-oleaginous continuous phase and an oleaginous discontinuous phase. Whether invert or direct emulsion, the ratio of the continuous phase to discontinuous phase in the oilfield emulsion, for example, may be in the range of 20:80 v/v CDR (continuous phase to discontinuous phase ratio) to 99:1 v/v CDR or, alternatively 20:80 v/v CDR to 90:10 v/v CDR or, alternatively 20:80 v/v CDR to 50:50 v/v CDR. The continuous phase (e.g., non-oleaginous phase) can be any suitable vol % of the oilfield emulsion. For example, the continuous phase can be about 1 vol % to about 99 vol % of the oilfield emulsion, about 10 vol % to about 50 vol %, or about 1 vol % or less, or about 2 vol %, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, about 99 vol %, or any ranges therebetween in the oilfield emulsion.

Further examples of base fluids may include, without limitation, aqueous fluids, non-aqueous fluids, slickwater fluids, aqueous gels, viscoelastic surfactant gels, and foamed gels. Examples of suitable aqueous fluids may include fresh water, saltwater, brine, seawater, and/or any other aqueous fluid. Examples of suitable non-aqueous fluids may include organic liquids, such as hydrocarbons (e.g., kerosene, xylene, toluene, or diesel), oils (e.g., mineral oils or synthetic oils), esters, and any combination thereof. Suitable slick-water fluids may generally be prepared by addition of small concentrations of polymers to water to produce what is known in the art as "slick-water." Some suitable polymers may include polyacrylamides. In other examples, polymers may polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. The term "polymer" in the context of a friction reducing polymer, refers to any form of the friction reducing polymer including acid, base, zwitterionic, and salt forms of the friction reducing polymer. Suitable aqueous gels may generally comprise an aqueous fluid and one or more gelling agents. Some gels may include polyacrylamides, polysaccharides, celluloses, xanthan, diutans, and combinations thereof. The gels may be present in any amount suitable to form a gel with desired properties. In some examples, a gel loading for a slick-water fluid may be about 10 liters per thousand liters ("LPT") or less. In some examples a slick-water additive, which may include a gelling agent, a polymer, or combinations thereof, may be present in an amount of about 0.5 LPT to about 10 LPT'. In other examples the slick-water additive may be included in an amount of about 0.5 LPT to about 1 ITT, about 1 LPT to about 2 LPT, about 2 LPT to about 3 LPT, about 3 LPT to about 4 LPT, about 4 LPT to about 5 LPT, about 5 LPT to about 6 LPT, about 6 LPT to about 7 LPT, about 7 LPT to about 8 LPT, about 8 LPT to about 9 LPT, about 9 LPT to about 10 LPT, or any combination thereof.

The foregoing treatment fluids may be used for any operation that impacts or contacts the well system including the wellbore environment, wellbore equipment, near wellbore environment, subterranean formation, flowlines connecting the wellhead to a production facility or a production facility vessel, production facility equipment (e.g., production facility vessels and/or separation vessels), flowlines connecting one piece of production facility equipment to another piece of production facility equipment, flowlines connecting the production facility equipment or vessels to one or more storage tanks, or flow lines connecting the production facility equipment to a lease custody transfer equipment (e.g., Lease Automatic Custody Transfer or "LACT," unit). In a non-limiting example, the application for treatment fluids containing supramolecular host guest products may include operations such as fluid production, fluid transfer, fluid separation, or post-production fluid treatment. In further examples, alkoxylate guests hosted by nanostructure hosts may be utilized in a treatment fluid which further may be injected into any of the foregoing well system locations (e.g., wellbores, pipelines, and/or vessels). The alkoxylates hosted by the nanostructure hosts may promote the breaking of emulsions in the production fluids disposed within the well system.

FIG. 1 illustrates a portion of a well system 100 which includes a wellbore 102 disposed in a subterranean formation 104 and a production tree 106 which is connected to wellbore 102 by a wellhead 108. As depicted, well system 100 does not include a pump or an artificial lift device. As such, the recovered production fluid is produced from wellbore 102 by the reservoir pressure of subterranean formation 104. In some examples, the reservoir pressure may not be enough to overcome the hydrostatic head of the fluid column disposed within the wellbore. In such examples, an artificial lift device may be installed on the well to facilitate the removal of production fluids from the wellbore. The artificial lift device may include any artificial lift device known in the art including but not limited to, pumping units utilizing rod strings and downhole pumps (e.g., "rod lift), gas lift, jet pumps (e.g., venturi pumps), plunger lift, and/or electric submersible pumps ("ESPs"). Well system 100 may be located on wellsite 110, where the production tree 106 and wellhead 108 are exposed at the surface of wellsite 110. Wellbore 102 may be disposed in subterranean formation 104 in any orientation including vertical, horizontal, and/or any combination thereof. Subterranean formation 104 may include multiple geological layers, some of which may include formation fluids including, in any combination, hydrocarbons and formation water. In some examples, the formation fluids may be produced to the surface of wellbore 102 (e.g., where wellbore 102 intersects with the surface of the earth) through a conduit such as production tubing 112. In other examples, the formation fluids may be produced to the surface of wellbore 102 through a passageway which is bounded by wellbore wall 114 without the benefit of production tubing 112. In some examples, one or more casing segments 116 may be disposed within wellbore 102 to support the structure of the wellbore (e.g., prevent wellbore collapse) and provide for isolation between the one or more geologic layers of subterranean formation 104. As such, the surface of wellbore wall 114 may include an inner surface of the inner most nested casing string of casing segments 116, an exposed formation face 118, or any combination thereof. In some examples, liquids may be produced to the surface through production tubing 112 while gasses are produced through an annular space 120 which exists between the outer diameter of production tubing 112 and wellbore wall 114. The portion of well system 100 which is disposed upstream from the wellhead may be referred to as the subterranean well system. The upstream direction may be understood in view of the production fluid flow path, where the production fluid starts in the subterranean formation, flows through the wellbore, and up to the surface where the wellhead is located. In other examples, the subterranean well system is disposed beneath the surface of the earth.

Once the production fluids reach the surface of wellbore 102 they may be transported to a production facility 122 through first flowline 124 which may include a combined fluid stream of second flowline 126 and third flowline 128. In some examples, second flowline 126 may primarily transport liquids such as liquid hydrocarbons and formation water, while third flowline 128 may primarily transport gas. However, in some examples, second flowline 126 may transport a combined fluid stream including liquid hydrocarbons, formation water, and gas. Additionally, third flowline 128 may transport liquid components along with the gas components. As depicted, second flowline 126 and third flowline 128 may merge together to create first flowline 124, which may then relay the production fluids to production facility 122. The portion of well system 100 which is disposed downstream from the wellhead may be referred to as the surface well system. The downstream direction may be understood in view of the production fluid flow path, where the production fluid starts in the subterranean formation, flows through the wellbore, and up to the surface well system including at least the wellhead, production tree, flowlines, and production facility. In some examples, the flowlines between the wellhead and the production facility may be buried to provide unrestricted surface access on the wellsite location and/or insulation from ambient temperatures, however, these flowlines may still be considered part of the surface well system. The wellhead and production tree may additionally be considered part of the surface well system. In some examples, production facility 122 may include equipment to separate, meter, and store various components of the production fluids. For example, production facility 122 may include separators or skimmers, including, but not limited to; free water knock-outs, electrostatic coalescers, heater treaters, desalters, flotation units, corrugate plate interceptors, hydrocyclones, and centrifuges. The separation methods utilized within production facility 122 may include gravity separation, enhanced gravity separation, electrocoalescence, flotation, heat-accelerated coalescence, and flocculation.

In some examples, well system 100 may include a chemical injection system 130. As depicted, chemical injection system 130 may be disposed in wellbore 102, however, chemical injection system may be additionally or alternatively disposed at the surface of wellsite 110 where it may be configured to inject chemicals into wellbore 102 from a surface pump. In further examples, chemical injection system 130 may be used to inject treatment fluids, such as treatment fluids containing supramolecular host guest products, into any one or more locations in a well system including wellbores, flowlines, or production facility equipment (e.g., production vessels used to separate and prepare production fluids to be sold). In examples where the chemical injection system 130 is disposed in a wellbore, it may be connected to the surface by a capillary string 132 which may relay treatment fluids from a chemical storage unit located at the wellsite 110 to a specified location in wellbore 102. The treatment fluids may include supramolecular host guest products further including surfactants which may prevent the formation of emulsions and/or increase the ease with which the combined stream of oil, water, and gas may be separated in the production facility 122. In further examples, the treatment fluids may include alkoxylate guests hosted by nanostructure hosts. The alkoxylates hosted by the nanostructure hosts may promote the breaking of emulsions in the production fluids disposed within the well system.

Figure 2:
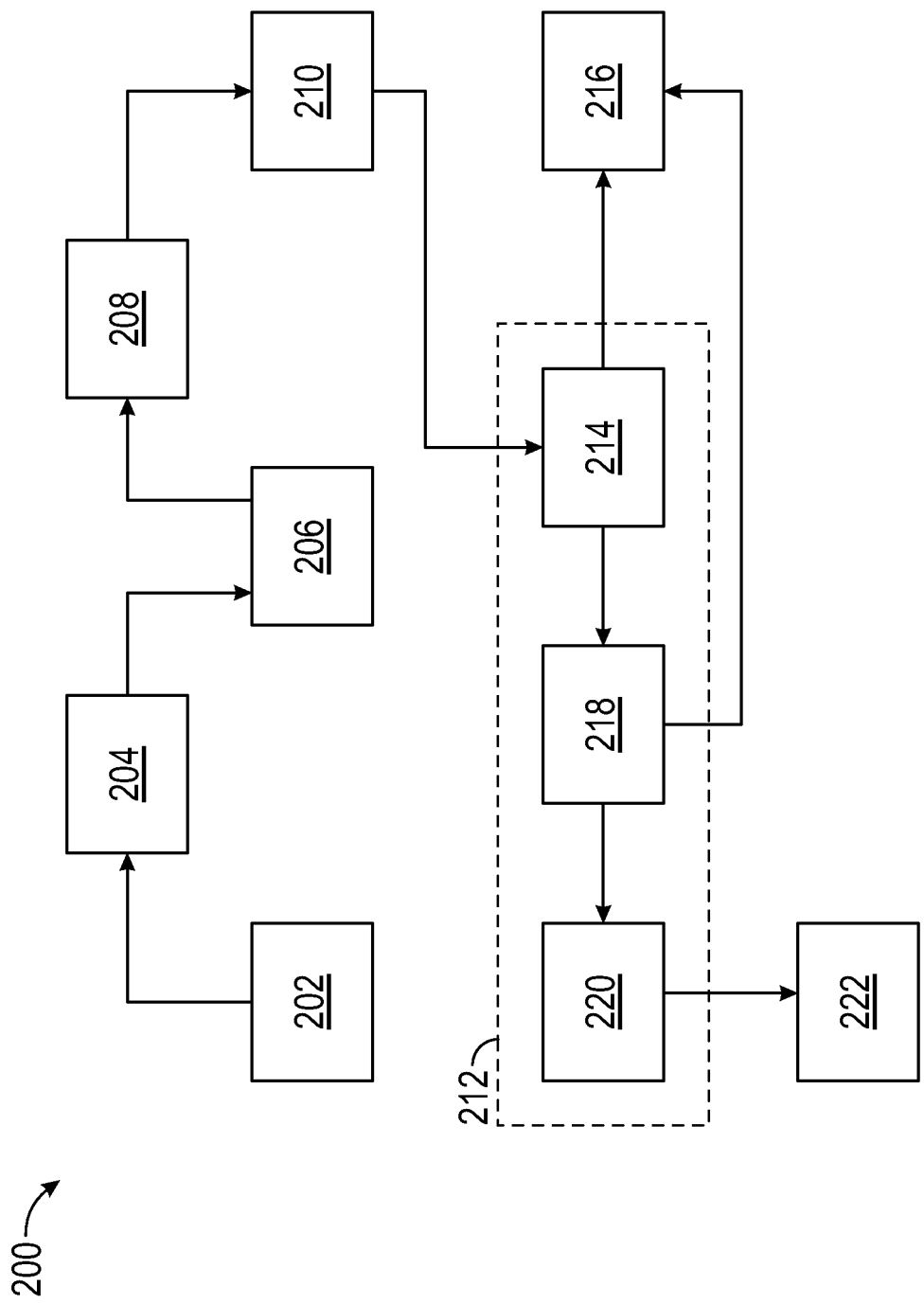
FIG. 2 illustrates a flow path for a production fluid from a subterranean formation to a lease custody transfer point in accordance with some embodiments of the present disclosure.

FIG. 2 is a process flow diagram of fluid production process 200, for example, where a production fluid may travel, from a subterranean formation to a lease custody transfer point. Treatment fluids which include supramolecular host guest products which may further include surfactants may be added at any point in the flow path to promote the separation of oil and water. As described above, the treatment fluids may include alkoxylate guests hosted by nanostructure hosts, which further may promote the breaking of emulsions in production fluids. In flow path 200, the production fluid may originate as a formation fluid in a pore space disposed in a reservoir 202. Based on either a natural or artificially induced pressure drop, the formation fluid may flow into a wellbore 204 and begin it's path to the surface of the well as a production fluid. The production fluid may be conducted through wellbore 204 to a wellhead 206 after which it may flow to one or more surface flowlines 208 by way of a production tubular, casing string, openhole wellbore, or a combination thereof. In wells that include artificial lift, there may be a benefit to at least partially separating the liquid and gas streams in the downhole environment since certain forms of artificial lift may not handle gas well. For example, insert pumps, tubing pumps, and ESPs may become gas locked if a critical amount of gas enters the pump. In cases where the gas and liquid are at least partially separated downhole, the surface flowlines 208 may include both a gas flowline and a liquid flowline which may be combined at the surface to create a comingled production flowline 210. In other cases, the surface flowlines 208 may be a single flowline of comingled production fluids and therefore may already be a comingled production flowline 210. The comingled production flowline 210 may relay the production fluids from the well system (e.g., well system 100 of FIG. 1) to a production facility 212.

In some examples, the production facility 212 may separate and meter the various components of the production fluid. For example, a first separator 214 may be used to separate at least a portion of the gas components from the liquid components (e.g., oil and water). The first separator 214 may include a two-phase separator, a high-pressure separator, a liquid knock-out, and similar equipment. In some examples, the first separator 214 may not separate all of the gas components from the production fluid stream. For example, if the first separator 214 is not properly sized, relative to the flow rate of the production stream, some gas may carry over to the other equipment in production facility 212. In other examples, gas may be entrained in the oil stream, and may require additional processing or settling to extract from the liquid phase. The gas extracted from the first separator 214 may be sent to a gas sales line, flare pit, or may be used as fuel 216. In some examples, the separated gas stream may pass through a compressor prior to entering the gas sales line 216. In other examples, either a portion or all of the gas extracted from the first separator 214 may be sent to a flare pit or used to power equipment either onsite or offsite. As such, the gas extracted from the first separator 214 may either be sold, burned, or used for onsite or offsite fuel.

The liquid component extracted from the first separator 214 may be introduced into a second separator 218. As previously mentioned, there may be gas entrained in the liquid component the exits the first separator 214. In some examples the second separator 218 may include an additional two-phase separator which operates at a lower pressure, a three-phase separator, a heater treater, or any other equipment suitable for further separating the phases from the liquid component from first separator 218. In some examples, the second separator 218 may be used to separate liquid hydrocarbons from produced formation water. As previously mentioned, liquid hydrocarbons and formation water may be produced in conditions which promote the creation of emulsions. As such, the second separator 218 may aid in breaking the emulsions formed between the liquid hydrocarbons and the produced formation water. The output from the second separator 218 may include individual streams of produced formation water, liquid hydrocarbons, and gas. The produced formation water and liquid hydrocarbons may be sent to storage tanks 220, where the produced water and liquid hydrocarbons may be stored separately before lease custody transfer occurs at the sales point 222. In some examples, the storage tanks 220 may be located onsite with the wellhead, while in other cases the storage tanks 220 may be located offsite. In some examples, lease custody transfer can occur when a truck removes the oil from the production tanks or when a LACT unit pumps and meters the oil into a sales line. For offshore operations the produced oil may be piped back to land prior to being sold or may be piped to a central gathering unit.

In embodiments, production facility 210 may include a first separator 214 and a second separator 218, where a purpose of first separator 214 is to separate the gas liquid components from the gas components and a purpose of second separator 218 is to separate the liquid hydrocarbons from the produced water. As such, the foregoing describes two stages of separation, however, additional equipment units which provide additional stages of separation, including two-phase and three-phase separation, may be included within a production facility. In some examples, there may only be one phase of separation. For example, only a single phase of separation may be utilized if the produced fluid does not contain a large gas component or if there are space restrictions in the production facility.

In embodiments, the treatment fluids which include supramolecular host guest products may be utilized in refinery operations such as treating emulsions within refinery units. Crude oil from a tank farm may be treated by a desalter before entering the main refining processes. The desalting process generally involves diluting the incoming crude oil with a relatively salt free water source thereby lowering the salt concentration of the oil-water mixture. The oil-water mixture may contain a water phase an oil phase with emulsified water entrained therein. The oil-water mixture may be allowed to separate in a settling vessel and the resultant water may be drawn off and sent to wastewater treatment. The oil separated in the desalter may be sent to atmospheric distillation, for example. Oftentimes an electric field is induced in the oil-water mixture through an electric grid positioned within the settling vessel to promote coalescence of entrained water. The electrical field imposes an electrical charge on the water droplets entrained in the bulk crude oil phase. The water droplets may coalesce into larger droplets, which can settle by gravity to the bulk liquid water phase. Crude oils often contain natural emulsifiers that may lead to a relatively stable emulsion that may be difficult to break due to kinetic stability. A treatment fluid including a supramolecular host guest product comprising a surfactant may be used in the desalter to promote separation of the emulsion into oil and water phases.

Figure 3:
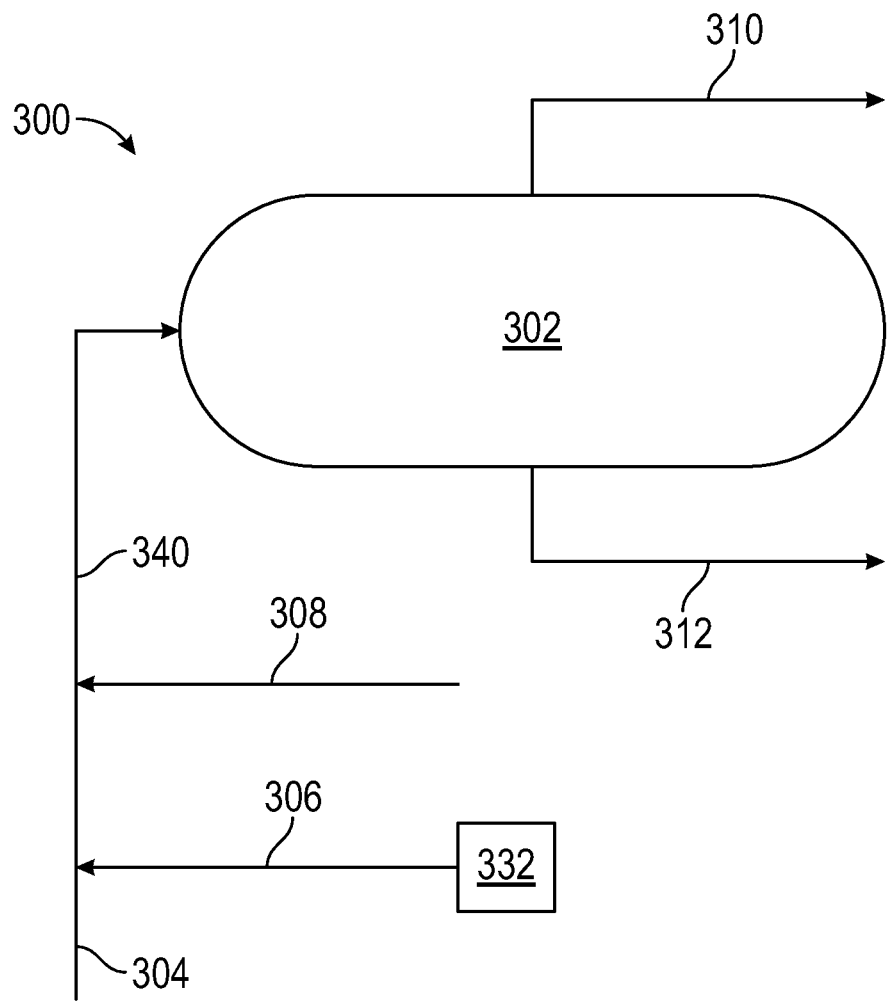
FIG. 3 illustrates a crude oil desalter unit.

FIG. 3 illustrates a desalter unit 300. As mentioned above, a goal of the crude oil desalter unit may be to remove salt from the connate water associated with the crude oil. In practice, this often includes adding additional water to the oil to dilute the concentration of salt. Crude oil stream 304 and water stream 308 may be contacted and mixed to provide the necessary dilution. A mixing valve or other mixing means may be utilized to mix crude oil stream 304 and water stream 308. The mixing of the oil from crude oil stream 304 and water from water stream 308 may cause emulsification of the oil and water and a mixed oil-water stream 340 containing oil, water, and emulsified oil and water may enter an inlet of crude oil desalter 302. In embodiments, a chemical additive source 332 may provide a chemical additive such as the treatment fluid comprising the supramolecular host guest product via chemical additive stream 306 to either crude oil stream 304 water stream 304 or mixed oil-water stream 340.

In crude oil desalter 302 the oil, water, and emulsified oil and water from mixed oil-water stream 340 may be allowed to stratify into oil and water phases. Typically there exists a water level in the bottom of the crude oil desalter, an emulsion containing transition zone where the volume percentages of oil and water continuously changes in a vertical direction, and a level of oil on top of the transition zone. In a process upset or excursion event, the transition zone containing the emulsion rises or lowers within the crude oil desalter 302. A rising emulsion layer may cause over carry of water to downstream process units and a lowering emulsion layer may cause under carry to wastewater processing. As such, there exists an operational envelope of emulsion position within crude oil desalter 302 where there is separation of the emulsion layer to stratified water and oil layers that does not cause over carry or under carry. The flow rate of treatment fluid comprising the supramolecular host guest product can be controlled to control the emulsion level within crude oil desalter 302.

As illustrated in FIG. 3, the separated oil from mixed oil-water stream 340 may exit crude oil desalter 302 as oil stream 310. Oil stream 310 may be conveyed to downstream processes such as a second stage desalter unit or distillation, for example. The separated water from mixed oil-water stream 340 may exit crude oil desalter 302 as water stream 312. Water stream 312 may be conveyed to wastewater processing or other units configured to process the content of water stream 312.

A large volume of water is used in refining processes including for cooling systems, stripping operations, fractionation, and desalting which must be treated in a refinery wastewater treatment plant before discharging. The refinery wastewater treatment plant may process water from refinery units such as desalter water, sour water from steam tripping and fractionating, product washing, catalyst regeneration and dehydrogenation reactions, spent caustic, cooling tower blowdown, and condensate blowdown, for example, in equipment designed to remove hydrocarbons to produce an aqueous rich stream and a hydrocarbon rich stream. In embodiments, a refinery wastewater treatment plant may include primary oil-water separator equipment such as API oil-water separators and secondary oil-water separator equipment such as flotation separators including, but not limited to, mechanical induced gas flotation, eductor induced gas flotation, dissolved gas flotation, vertical flotation units, or any other suitable unit. A treatment fluid including a supramolecular host guest product comprising a surfactant may be used in the refinery wastewater treatment plant to promote separation of the emulsion into oil and water phases. A treatment fluid may be introduced into a feed to an API oil water separator or flotation separator in the refinery wastewater treatment plant, for example.

In embodiments, the treatment fluid comprising the supramolecular host guest products including surfactants can be used in refinery operations where emulsions are present. Quenching operations may have hydrocarbon carryover into the quench water stream and cooling towers may collect hydrocarbons. The treatment fluid may be introduced into any such unit to treat emulsions which may form.

Treatment fluids comprising supramolecular host guest products including surfactants which may be added at any point in the flow path to promote the separation of oil and water. For example, treatment fluids which include supramolecular host guest products may be injected into the subterranean formation in a chemical squeeze, injected into the wellbore through batch treating or via a capillary string, injected into the wellhead, injected into the production stream in the surface lines between the wellhead and the production facility, injected into equipment in the production facility, injected into the flow lines connecting the equipment in the production facility, or any combination thereof.

Accordingly, the present disclosure may provide for a treatment fluid for use in wellbore operations which may facilitate concentration of the treatment fluid additives at an interface of interest such that the treatment fluid may be both more effective and may be utilized at lower concentrations. The methods/systems/compositions/tools may include any of the various features disclosed herein, including one or more of the following statements.

Statement 1. A method comprising introducing a treatment fluid into a production fluid disposed in a surface well system, the treatment fluid comprising: a base fluid; and a supramolecular host guest product comprising: a treatment fluid additive comprising a surfactant; and a supramolecular host molecule, wherein the supramolecular host molecule is not covalently bonded to the treatment fluid additive; introducing the production fluid containing the treatment fluid into a production facility separator; and separating, in the production facility separator, at least a portion of the production fluid to form a water stream.

Statement 2. The method of statement 1, wherein the production facility separator comprises at least one separator selected from the group consisting of free water knock-outs, electrostatic coalescers, heater treaters, flotation units, corrugate plate interceptors, hydrocyclones, and centrifuges, and combinations thereof.

Statement 3. The method of statement 1 or 2, wherein the surface well system comprises at least one component of the well system selected from the group consisting of a flow line, one or more production facility equipment units, and combinations thereof.

Statement 4. The method of statement 3, wherein the flow line further comprises a production flow line between a wellhead and the production facility equipment, a production facility equipment flowline between two or more production facility vessels, and combinations thereof.

Statement 5. The method of statement 4, wherein the two or more production facility vessels comprise at least two production facility vessels selected from the group consisting of free water knock-outs, electrostatic coalescers, heater treaters, flotation units, corrugate plate interceptors, hydrocyclones, and centrifuges, and combinations thereof.

Statement 6. The method of any preceding statement, wherein the treatment fluid additive comprises at least one surfactant selected from the group consisting of sodium, potassium, and ammonium salts of long chain alkyl sulfonates and alkyl aryl sulfonates, dialkyl sodium sulfosuccinates, alkyl sulfates, alkyl sulfonates, and alkoxylated sulfates, non-ionic surfactants such as ethoxylated alcohols and polyglucosides; cationic surfactants such as alkyl ammonium bromides, amphoteric or zwitterionic surfactants, hydroxysultaines, polymeric alkoxylates of phenolic resins, bis-phenol polymers, imines, alcohols, esters and complex esters thereof, quaternary amines and polymers thereof, low molecular-weight aliphatic moieties, or polar organic functional groups such as amidoamines, amines, amides, glycols, silicates, polymers, esters, ethers, quaternized alkyl or aryl molecules, conjugates or derivatized macromolecules, oxidizer or oxidizing agents, reducer or reducing agents, metal (oxy)anion salts where the metal is a multivalent (n) cation (n=+2, +3, +4, +5, +6, +7) and the anion is a halide, sulfur or selenium, nitrogen or phosphorous, and combinations thereof.

Statement 7. The method of any preceding statement, wherein the supramolecular host molecule comprises at least one supramolecular host molecule selected from the group consisting of crown ethers, lariat ethers, cavitands, cryptands, rotaxanes, catenanes, calixarenes, nanostructures, metal organic frameworks, and combinations thereof.

Statement 8. The method of any preceding statement, wherein the supramolecular host molecule is included in the treatment fluid in an amount from about 15 wt % to about 75 wt. % of the treatment fluid.

Statement 9. The method of any preceding statement, wherein the treatment fluid additive is included in the treatment fluid in an amount from about 15 wt. % to about 75 wt. %.

Statement 10. The method of any preceding statement, wherein the treatment fluid additive is included in the treatment fluid in an amount that is less than about 2% by volume.

Statement 11. A method comprising: introducing a treatment fluid into a production fluid disposed in a flowline, the treatment fluid comprising: a base fluid; and a supramolecular host guest product comprising: a treatment fluid additive comprising a surfactant, wherein the treatment fluid additive is included in the treatment fluid in an amount that is less than about 2% by volume; and a supramolecular host molecule, wherein the supramolecular host molecule is not covalently bonded to the treatment fluid additive; introducing the production fluid containing the treatment fluid into a production facility separator; and separating, in the production facility separator, at least a portion of the production fluid to form a water stream.

Statement 12. The method of statement 11, wherein the production facility separator comprises at least one separator selected from the group consisting of free water knock-outs, electrostatic coalescers, heater treaters, flotation units, corrugate plate interceptors, hydrocyclones, and centrifuges, and combinations thereof.

Statement 13. The method of statements 11 or 12, wherein the treatment fluid additive comprises at least one surfactant selected from the group consisting of sodium, potassium, and ammonium salts of long chain alkyl sulfonates and alkyl aryl sulfonates, dialkyl sodium sulfosuccinates, alkyl sulfates, alkyl sulfonates, and alkoxylated sulfates, non-ionic surfactants, ethoxylated alcohols, polyglucosides, cationic surfactants, alkyl ammonium bromides, amphoteric or zwitterionic surfactants, hydroxysultaines, polymeric alkoxylates of phenolic resins, bis-phenol polymers, imines, alcohols, esters and complex esters thereof, quaternary amines and polymers thereof, low molecular-weight aliphatic moieties, polar organic functional groups, amidoamines, amines, amides, glycols, silicates, polymers, esters, ethers, quaternized alkyl or aryl molecules, conjugates or derivatized macromolecules, oxidizer or oxidizing agents, reducer or reducing agents, metal (oxy)anion salts where the metal is a multivalent (n) cation (n=+2, +3, +4, +5, +6, +7) and the anion is a halide, sulfur or selenium, nitrogen or phosphorous, and combinations thereof.

Statement 14. The method of any preceding statements 11 through 13, wherein the supramolecular host molecule comprises at least one supramolecular host molecule selected from the group consisting of crown ethers, lariat ethers, cavitands, cryptands, rotaxanes, catenanes, and combinations thereof.

Statement 15. The method of any preceding statements 11 through 14, wherein the supramolecular host molecule is included in the treatment fluid in an amount from about 15 wt. % to about 75 wt. % of the treatment fluid.

Statement 16. A method comprising: introducing a feed stream into a separator, wherein the feed stream comprises: a hydrocarbon; a water; and a supramolecular host guest product comprising: a treatment fluid additive comprising a surfactant; and a supramolecular host molecule, wherein the supramolecular host molecule is not covalently bonded to the treatment fluid additive;

and separating at least a portion of the hydrocarbons from the feed stream to form a hydrocarbon rich stream.

Statement 17. The method of statement 16, wherein the supramolecular host molecule comprises at least one supramolecular host molecule selected from the group consisting of crown ethers, lariat ethers, cavitands, cryptands, rotaxanes, catenanes, calixarenes, nanostructures, metal organic frameworks, and combinations thereof and wherein the surfactant comprises at least one surfactant is selected from the group consisting of sodium, potassium, and ammonium salts of long chain alkyl sulfonates and alkyl aryl sulfonates, dialkyl sodium sulfosuccinates, alkyl sulfates, alkyl sulfonates, and alkoxylated sulfates, non-ionic surfactants, ethoxylated alcohols, polyglucosides, cationic surfactants, alkyl ammonium bromides, amphoteric or zwitterionic surfactants, hydroxysultaines, polymeric alkoxylates of phenolic resins, bis-phenol polymers, imines, alcohols, esters and complex esters thereof, quaternary amines and polymers thereof, low molecular-weight aliphatic moieties, polar organic functional groups, amidoamines, amines, amides, glycols, silicates, polymers, esters, ethers, quaternized alkyl or aryl molecules, conjugates or derivatized macromolecules, oxidizer or oxidizing agents, reducer or reducing agents, metal (oxy)anion salts where the metal is a multivalent (n) cation (n=+2, +3, +4, +5, +6, +7) and the anion is a halide, sulfur or selenium, nitrogen or phosphorous, and combinations thereof.

Statement 18. The statement of claim 16 wherein the feed stream comprises at least one feed selected from the group consisting of desalter water, sour water from steam stripping, fractionating, product washing, catalyst regeneration and dehydrogenation reactions, spent caustic, cooling tower blowdown, and condensate blowdown, and combinations thereof.

Statement 19. A method comprising: mixing a crude oil stream with a water stream and a treatment fluid stream to form an emulsion, wherein the treatment fluid comprises a supramolecular host guest product comprising: a treatment fluid additive comprising a surfactant; and a supramolecular host molecule, wherein the supramolecular host molecule is not covalently bonded to the treatment fluid additive; and; introducing the emulsion into a crude oil desalter; separating the emulsion into an oil rich phase and a water rich phase; and withdrawing the oil rich phase and the water rich phase from the crude oil desalter.

Statement 20. The method of statement 19, wherein the supramolecular host molecule comprises at least one supramolecular host molecule selected from the group consisting of crown ethers, lariat ethers, cavitands, cryptands, rotaxanes, catenanes, calixarenes, nanostructures, metal organic frameworks, and combinations thereof and wherein the surfactant comprises at least one surfactant is selected from the group consisting of sodium, potassium, and ammonium salts of long chain alkyl sulfonates and alkyl aryl sulfonates, dialkyl sodium sulfosuccinates, alkyl sulfates, alkyl sulfonates, and alkoxylated sulfates, non-ionic surfactants, ethoxylated alcohols, polyglucosides, cationic surfactants, alkyl ammonium bromides, amphoteric or zwitterionic surfactants, hydroxysultaines, polymeric alkoxylates of phenolic resins, bis-phenol polymers, imines, alcohols, esters and complex esters thereof, quaternary amines and polymers thereof, low molecular-weight aliphatic moieties, polar organic functional groups, amidoamines, amines, amides, glycols, silicates, polymers, esters, ethers, quaternized alkyl or aryl molecules, conjugates or derivatized macromolecules, oxidizer or oxidizing agents, reducer or reducing agents, metal (oxy)anion salts where the metal is a multivalent (n) cation (n=+2, +3, +4, +5, +6, +7) and the anion is a halide, sulfur or selenium, nitrogen or phosphorous, and combinations thereof.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   introducing a treatment fluid into a production fluid disposed in a surface well system, the treatment fluid comprising:
   a base fluid; and
   a supramolecular host guest product comprising:
      a treatment fluid additive comprising a surfactant and alkoxylate guests hosted by nanostructure hosts; and
      a supramolecular host molecule, wherein the supramolecular host molecule is not covalently bonded to the treatment fluid additive;
   introducing the production fluid containing the treatment fluid into a production facility separator;
   delivering the treatment fluid additive within a bulk phase of the treatment fluid to an interface in the production facility separator, and
   separating, in the production fluid facility separator, at least a portion of the production fluid to form a water stream.

2. The method of claim 1, wherein the production facility separator comprises at least one separator selected from the group consisting of free water knock-outs, electrostatic coalescers, heater treaters, flotation units, corrugate plate interceptors, hydrocyclones, and centrifuges, and combinations thereof.

3. The method of claim 1, wherein the surface well system comprises a flow line, wherein the flow line further comprises a production flow line between a wellhead and a production facility equipment.

4. The method of claim 1, wherein the treatment fluid additive comprises sodium, potassium, and ammonium salts of long chain alkyl sulfonates and alkyl aryl sulfonates, dialkyl sodium sulfosuccinates, alkyl sulfates, alkyl sulfonates, and alkoxylated sulfates, ethoxylated alcohols and polyglucosides.

5. The method of claim 1, wherein the supramolecular host molecule comprises rotaxanes.

6. The method of claim 1, wherein the supramolecular host molecule is included in the treatment fluid in an amount from 15 wt % to 75 wt % of the treatment fluid.

7. The method of claim 1, wherein the treatment fluid additive is included in the treatment fluid in an amount from 15 wt % to 75 wt %.

8. The method of claim 1, wherein the treatment fluid additive is included in the treatment fluid in an amount ranging from 0.01 wt. % to 2 wt. %.

* * * * *